United States Patent
Khoshnevisan et al.

(10) Patent No.: US 11,184,888 B2
(45) Date of Patent: Nov. 23, 2021

(54) RATE MATCHING FOR A DOWNLINK TRANSMISSION WITH MULTIPLE TRANSMISSION CONFIGURATIONS

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/580,162

(22) Filed: Sep. 24, 2019

(65) Prior Publication Data
US 2020/0100225 A1    Mar. 26, 2020

Related U.S. Application Data

(60) Provisional application No. 62/736,147, filed on Sep. 25, 2018.

(51) Int. Cl.
H04W 72/04      (2009.01)
H04L 1/18       (2006.01)

(52) U.S. Cl.
CPC ......... *H04W 72/042* (2013.01); *H04L 1/1854* (2013.01); *H04W 72/048* (2013.01)

(58) Field of Classification Search
None
See application file for complete search history.

(56) References Cited

U.S. PATENT DOCUMENTS

| 10,784,893 | B2 * | 9/2020 | Ma ...................... | H03M 13/616 |
| 2015/0092671 | A1 * | 4/2015 | Fiallos .................. | H04L 5/0078 |
| | | | | 370/329 |
| 2018/0034592 | A1 * | 2/2018 | Cao ........................ | H04L 1/0073 |

(Continued)

OTHER PUBLICATIONS

Ericsson: "On Beam Indicaton, Measurement and Reporting", 3GPP TSG-RAN WG1 #90bis, 3GPP Draft; R1-1718433 on Beam Indication, Measurement and Reporting, 3rd Generation Partnership Project (3GPP), Mobile Competence Centre; 650, Route Des Lucioles; F-06921 Sophia-Antipolis Cedex ; France, vol. RAN WG1, No. Prague, Czech Republic; Oct. 9, 2017-Oct. 13, 2017 Oct. 8, 2017, XP051341615, Retrieved from the Internet: URL:http://www.3gpp.org/ftp/Meetings_3GPP_SYNC/RAN1/Docs/ [retrieved on Oct. 8, 2017] section 2; Sections 2.4-2.7, figure 1 figure 2.

(Continued)

*Primary Examiner* — Otis L Thompson, Jr.
(74) *Attorney, Agent, or Firm* — Michael J. DeHaemer, Jr.

(57) ABSTRACT

Certain aspects of the present disclosure provide techniques for rate-matching for a transmission by multiple transmission configuration indicator (TCI) states, such as a multiple transmission reception point (multi-TRP) transmission. A method by a user equipment (UE) includes receiving one downlink control information (DCI) scheduling a downlink transmission associated with multiple transmission configuration indicator (TCI) states. The UE determines whether the downlink transmission is associated with one rate matching or is associated with a separate rate matching for each of the multiple TCI states. The UE derate matches the downlink transmission based on the determination.

22 Claims, 15 Drawing Sheets

(56) References Cited

U.S. PATENT DOCUMENTS

| | | | |
|---|---|---|---|
| 2018/0199350 A1* | 7/2018 | John Wilson | H04L 1/0057 |
| 2018/0324689 A1* | 11/2018 | Li | H04W 72/14 |
| 2018/0351698 A1* | 12/2018 | Lin | H04L 1/0041 |
| 2018/0375616 A1* | 12/2018 | Beale | H04L 1/08 |
| 2019/0229792 A1 | 7/2019 | John Wilson et al. | |
| 2019/0253308 A1 | 8/2019 | Huang et al. | |
| 2019/0334585 A1* | 10/2019 | Lee | H04L 5/0044 |
| 2019/0349060 A1 | 11/2019 | Liao et al. | |
| 2019/0379506 A1* | 12/2019 | Cheng | H04B 7/0695 |
| 2019/0387580 A1 | 12/2019 | Chang et al. | |
| 2020/0007296 A1 | 1/2020 | Papasakellariou | |
| 2020/0015200 A1 | 1/2020 | Vilaipornsawai et al. | |
| 2020/0067676 A1* | 2/2020 | Yi | H04L 5/0091 |
| 2020/0100225 A1* | 3/2020 | Khoshnevisan | H04L 1/0013 |
| 2020/0100311 A1 | 3/2020 | Cirik et al. | |
| 2020/0107353 A1* | 4/2020 | Jung | H04W 72/042 |
| 2020/0128546 A1* | 4/2020 | Shi | H04W 72/0453 |

OTHER PUBLICATIONS

International Search Report and Written Opinion—PCT/US2019/052920—ISA/EPO—dated Dec. 9, 2019.

Mediatek Inc: "Multi-TRP and Multi-panel Transmission", 3GPP TSG RAN WG1 Meeting #88bis, 3GPP Draft; R1-1707837 Multi-TRP Final, 3rd Generation Partnership Project (3GPP), Mobile Competence Centre, 650, Route Des Lucioles ; F-06921 Sophia-Antipolis Cedex, France, vol. RAN WG1, No. Hangzhou; May 15, 2017-May 19, 2017, May 14, 2017, (May 14, 2017), pp. 1-4, XP051273038, Retrieved from the Internet: URL: http://www.3gpp.org/ftp/Meetings_3GPP_SYNC/RAN1/Docs/ [retrieved on May 14, 2017], Section 2.

Qualcomm Incorporated: "Multi-TRP Enhancements", 3GPP TSG RAN WG1 Meeting #96, 3GPP Draft; R1-1903043 Multi-TRP Enhancements, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Feb. 25, 2019-Mar. 1, 2019, Feb. 16, 2019 (Feb. 16, 2019), 30 Pages, XP051600739, Retrieved from the Internet: URL: http://www.3gpp.org/ftp/tsg%5Fran/WG1%5FRL1/TSGR1%5F96/Docs/R1%2D1903043%2Ezip [retrieved on Feb. 16, 2019] Section 4.1.

Vivo: "Remaining Details on DCI Content and Formats", 3GPP TSG RAN WG1 Meeting #92, 3GPP Draft; R1-1801533, 3rd Generation Partnership Project (3GPP), Mobile Competence Centre, 650, Route Des Lucioles; F-06921 Sophia-Antipolis Cedex, France, vol. RAN WG1,No. Athens, Greece; Feb. 26, 2018-Mar. 2, 2018, Feb. 15, 2018 (Feb. 15, 2018), 5 Pages, XP051396785, Retrieved from the Internet: URL: http://www.3gpp.org/ftp/tsg_ran/WG1_RL1/TSGR1_92/Docs/ [retrieved on Feb. 15, 2018], Sections 1, 2.1.

\* cited by examiner

Two RVs (option2): RV1=0, RV2=0

— — — ▶ TCI state 1
------▶ TCI state 2

RATE MATCHING FOR A DOWNLINK TRANSMISSION WITH MULTIPLE TRANSMISSION CONFIGURATIONS

CROSS-REFERENCE TO RELATED APPLICATION(S)

This application claims benefit of and priority to U.S. Provisional Patent Application Ser. No. 62/736,147, filed Sep. 25, 2018, herein incorporated by reference in its entirety as if fully set forth below and for all applicable purposes.

BACKGROUND

Field of the Disclosure

Aspects of the present disclosure relate to wireless communications, and more particularly, to techniques for rate matching for multiple transmission reception point (TRP) transmissions.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. NR (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects provide a method for wireless communication by a user equipment (UE). The method generally includes receiving one downlink control information (DCI) transmission scheduling a downlink transmission associated with multiple transmission configuration indicator (TCI) states. The method generally includes determining whether the downlink transmission is associated with one rate matching or is associated with a separate rate matching for each of the multiple TCI state and derate matching the downlink transmission based on the determination.

Certain aspects provide a method for wireless communication by base station (BS). The method generally includes determining rate matching parameters for a downlink transmission associated with multiple TCI states. The downlink transmission is associated with one rate matching or is associated with a separate rate matching for each of the multiple TCI states. The method generally includes performing rate matching for at least a portion of the downlink transmission using the determined rate matching parameters. The method generally includes transmitting the at least the portion of the downlink transmission to a UE.

Certain aspects provide an apparatus for wireless communication. The apparatus generally includes means for receiving one DCI transmission scheduling a downlink transmission associated with multiple TCI states. The apparatus generally includes means for determining whether the downlink transmission is associated with one rate matching or is associated with a separate rate matching for each of the multiple TCI state and means for derate matching the downlink transmission based on the determination.

Certain aspects provide an apparatus for wireless communication. The apparatus generally includes means for determining rate matching parameters for a downlink transmission associated with multiple TCI states. The downlink transmission is associated with one rate matching or is associated with a separate rate matching for each of the multiple TCI states. The apparatus generally includes means for performing rate matching for at least a portion of the downlink transmission using the determined rate matching parameters. The apparatus generally includes means for transmitting the at least the portion of the downlink transmission to a UE.

Certain aspects provide an apparatus for wireless communication. The apparatus generally includes a memory and at least one processor coupled with the memory. The at least one processor is generally configured to receive one DCI transmission scheduling a downlink transmission associated with multiple TCI states. The at least one processor is generally configured to determine whether the downlink transmission is associated with one rate matching or is associated with a separate rate matching for each of the multiple TCI state. The at least one processor is generally configured to derate match the downlink transmission based on the determination.

Certain aspects provide an apparatus for wireless communication. The apparatus generally includes a memory and at least one processor coupled with the memory. The at least one processor is generally configured to determine rate matching parameters for a downlink transmission associated with multiple TCI states. The downlink transmission is associated with one rate matching or is associated with a separate rate matching for each of the multiple TCI states. The at least one processor is generally configured to perform rate matching for at least a portion of the downlink transmission using the determined rate matching parameters. The at least one processor is generally configured to transmit the at least the portion of the downlink transmission to a UE.

Certain aspects provide a computer readable medium storing computer executable code thereon for wireless communication. The computer readable medium generally includes code for receiving one DCI transmission scheduling a downlink transmission associated with multiple TCI states. The computer readable medium generally includes code for determining whether the downlink transmission is associated with one rate matching or is associated with a separate rate matching for each of the multiple TCI state and code for derate matching the downlink transmission based on the determination.

Certain aspects provide a computer readable medium storing computer executable code thereon for wireless communication. The computer readable medium generally includes code for determining rate matching parameters for a downlink transmission associated with multiple TCI states. The downlink transmission is associated with one rate matching or is associated with a separate rate matching for each of the multiple TCI states. The computer readable medium generally includes code for performing rate matching for at least a portion of the downlink transmission using the determined rate matching parameters. The computer readable medium generally includes code for transmitting the at least the portion of the downlink transmission to a UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
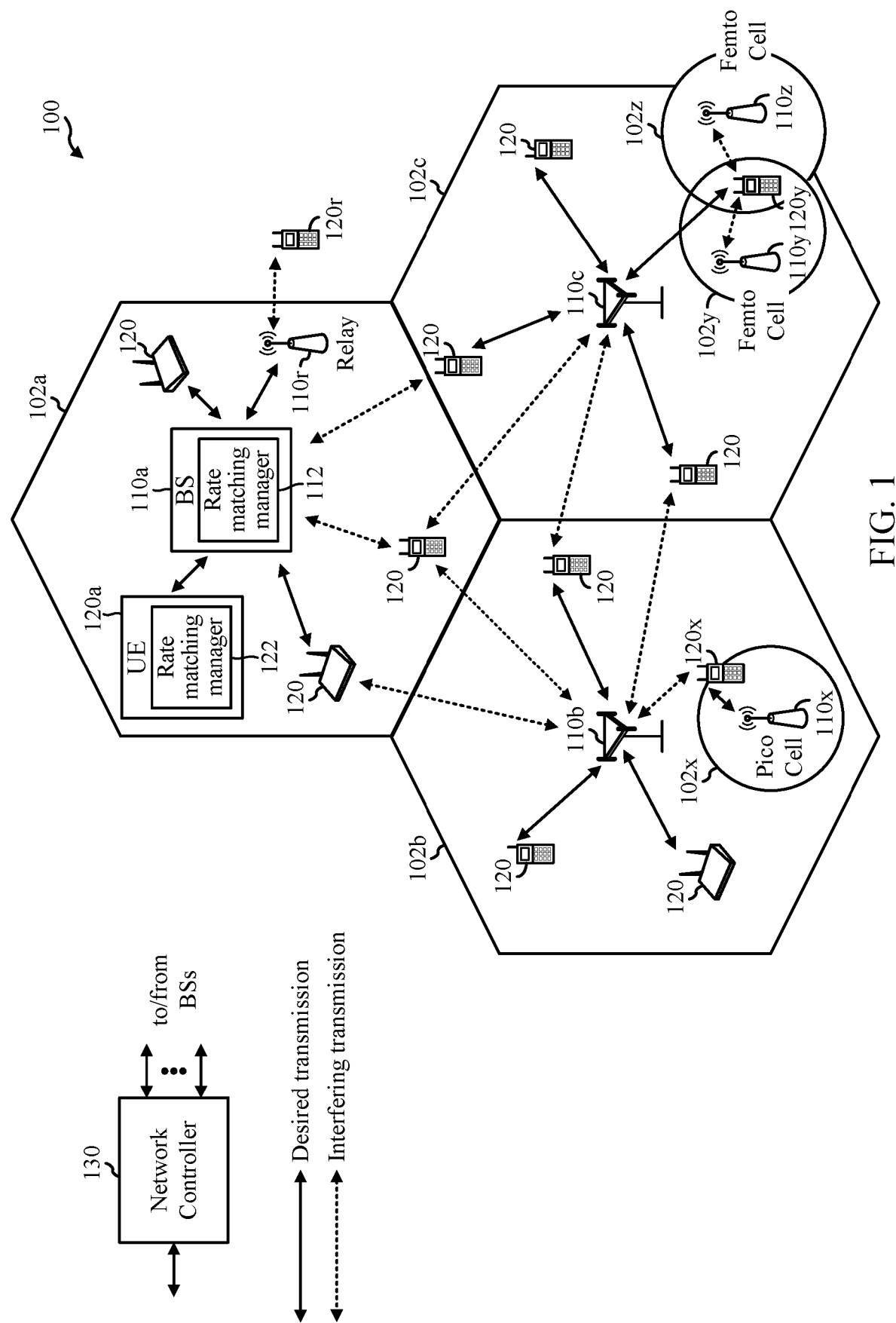
FIG. 1 is a block diagram conceptually illustrating an example telecommunications system, in accordance with certain aspects of the present disclosure.

Aspects of the present disclosure provide apparatus, methods, processing systems, and computer readable mediums for rate matching for a downlink multiple transmission configuration indictor (TCI) state transmission. A multi-TCI state transmission can be associated with a transmission reception point (TRP), multiple TRPs (e.g., a multi-TRP transmission), and/or quasi-colocation (QCL) parameters. Certain aspects provide for joint or separate rate matching and derate matching. According to certain aspects, a single downlink control information (DCI) transmission can be received by a user equipment (UE) including rate matching parameters for the multi-TCI state transmission, such as resource blocks (RBs), modulation order, and redundancy version (RV) for the multi-TCI state transmission. The rate matching parameters may be shared for joint rate matching or separate for each TCI state for separate rate matching.

The following description provides examples of rate matching for multi-TCI state transmission, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless networks and radio technologies. In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

While aspects may be described herein using terminology commonly associated with 3G and/or 4G wireless technologies, aspects of the present disclosure can be applied in other generation-based communication systems, such as 5G and later, including new radio (NR) technologies. NR access (e.g., 5G NR technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Certain wireless networks utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

NR may utilize OFDM with a cyclic prefix (CP) on the uplink and downlink and include support for half-duplex operation using time division duplexing (TDD). In NR, a subframe may be 1 ms, but the basic transmission time interval (TTI) may be referred to as a slot. A subframe contains a variable number of slots (e.g., 1, 2, 4, 8, 16, . . . slots) depending on the subcarrier spacing (SCS). The NR RB may be 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. NR may support beamforming and beam direction may be dynamically configured. Multiple-input multiple-output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be a 5G NR network. UEs 120 may be receive downlink transmissions via multiple transmission indicator (TCI) states, for example, one or more BSs 110 may be involved in multiple transmission reception point (multi-TRP) transmission to a UE 120. The one or more BSs 110 may use joint rate matching or separate rate matching for the multi-TCI state transmission. The BSs 110 may send a single downlink control information (DCI) transmission for the multi-TCI state transmission, for example, including shared or separate rate matching parameters such as resource set(s), modulation order, and/or redundancy version(s) (RV) for the multi-TCI state downlink transmissions. The UE 120 can determine whether the multi-TCI state downlink transmission uses joint or separate rate matching (e.g., based on the DCI) and the UE 120 performs derate matching accordingly.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area. In 3GPP, the term "cell" which may be stationary or mobile according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile According to certain aspects, the BSs 110 and UEs 120 may be configured for multi-TCI state communication, such multi-TRP. As shown in FIG. 1, the BS 110a includes a rate matching manager 112. The rate matching manager 112 may be configured to perform joint or separate rate matching for a multi-TCI state downlink transmission, in accordance with aspects of the present disclosure. As shown in FIG. 1, the UE 120a includes a rate matching manager 122. The rate matching manager 122 may be configured to determine whether a multi-TCI state downlink transmission uses joint or separate rate matching and derate matching the multi-TCI state downlink transmission based on the determination, in accordance with aspects of the present disclosure.

Wireless communication network 100 may also include relay stations (e.g., relay station 110r), also referred to as relays or the like, receive a transmission of data and/or other information from an upstream station (e.g., a BS 110*a* or a UE 120*r*) and sends a transmission of the data and/or other information to a downstream station (e.g., a UE 120 or a BS 10=10), and/or that relays transmissions between UEs 120 to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE 120 may function as a scheduling entity and may schedule resources for one or more subordinate entities (e.g., one or more other UEs 120), and the other UEs may utilize the resources scheduled by the UE for wireless communication. In some examples, a UE 120 may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
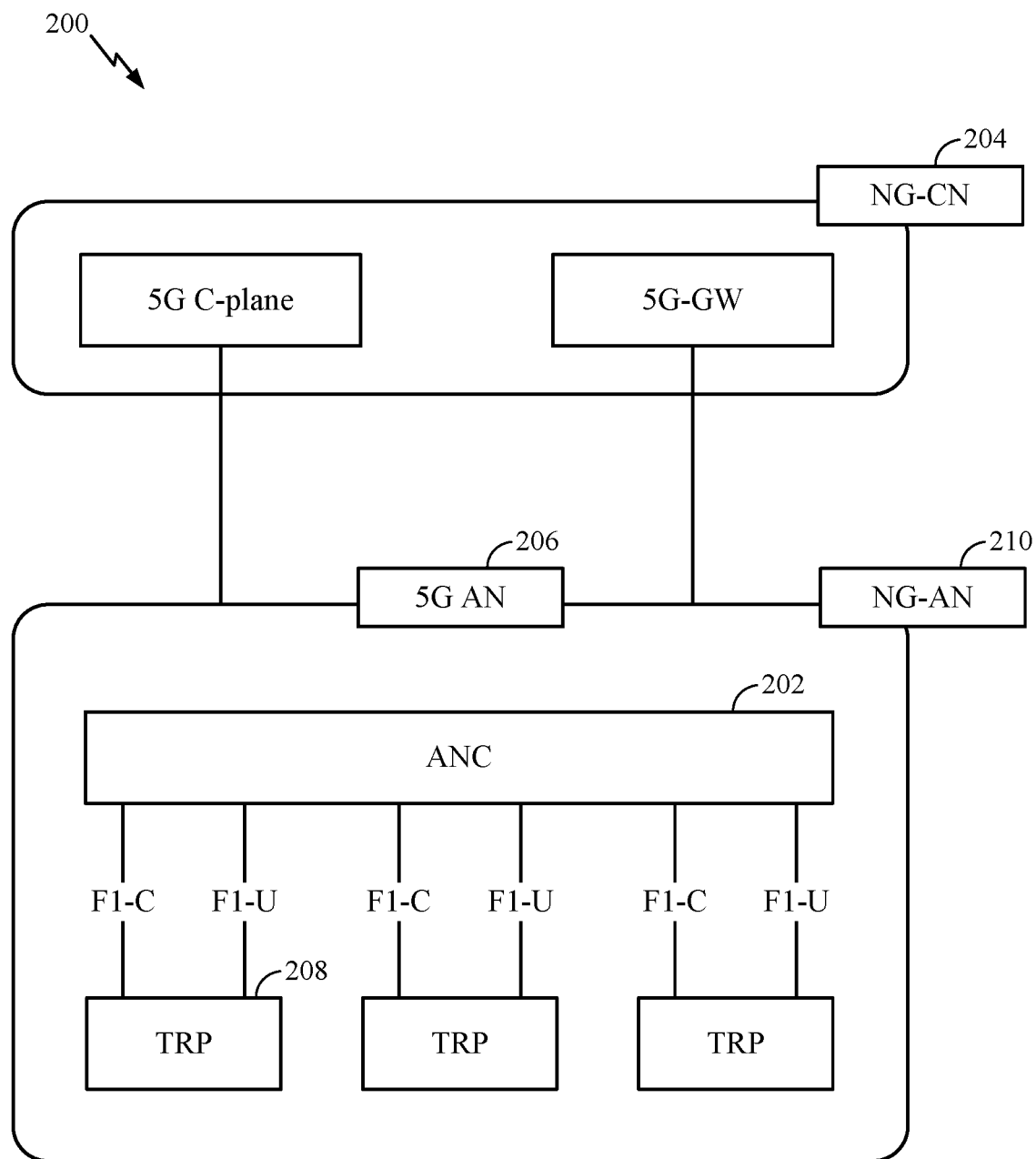
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter). The logical architecture of distributed RAN 200 may share features and/or components with LTE. For example, next generation access node (NG-AN) 210 may support dual connectivity with NR and may share a common fronthaul for LTE and NR. The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
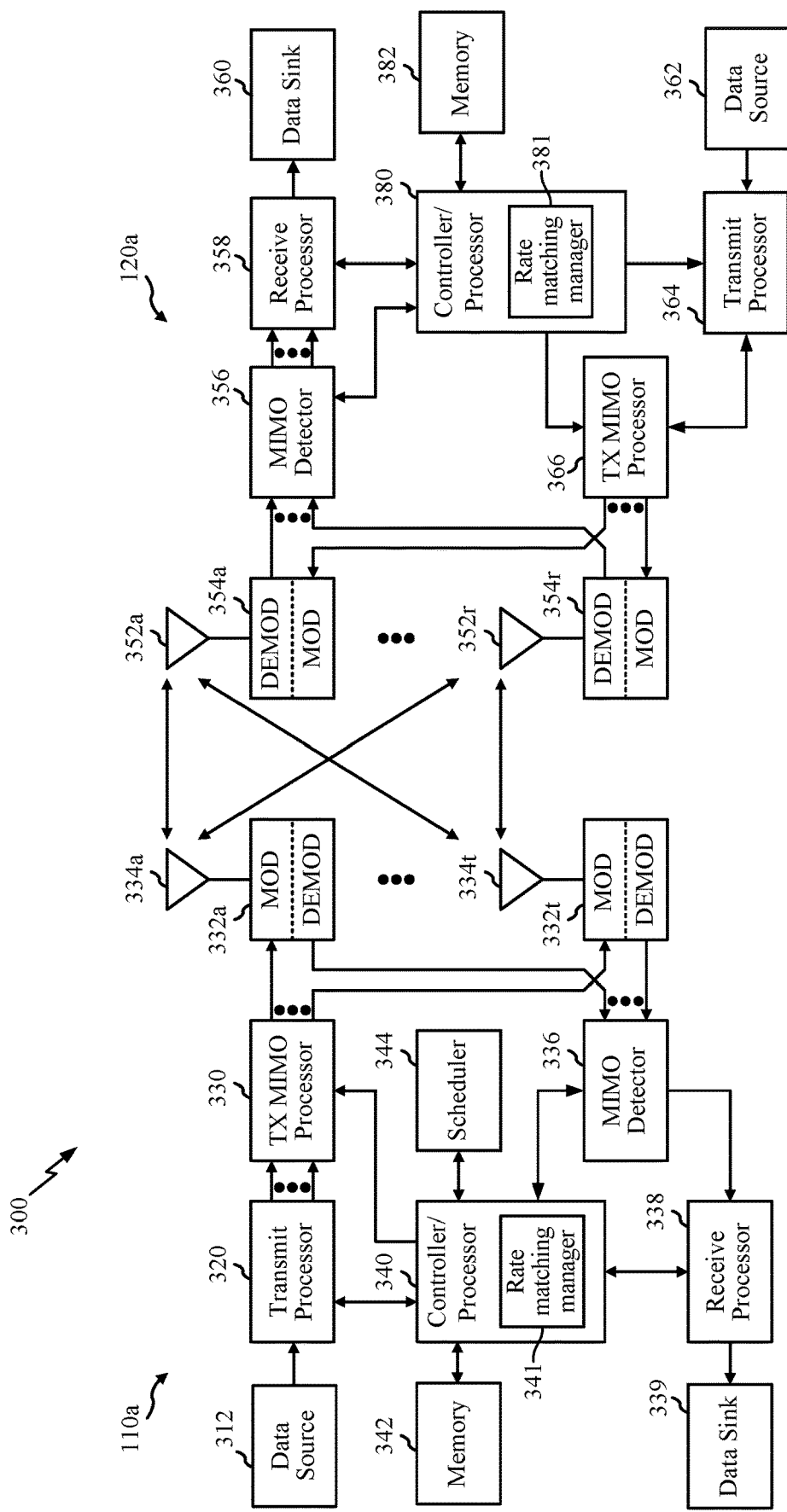
FIG. 3 is a block diagram conceptually illustrating a design of an example base station (BS) and user equipment (UE), in accordance with certain aspects of the present disclosure.

FIG. 3 illustrates example components of BS 110*a* and UE 120*a* (as depicted in FIG. 1), which may be used to implement aspects of the present disclosure.

At the BS 110*a*, a transmit processor 320 may receive data from a data source 312 and control information from a controller/processor 340. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 320 may process (e.g., encode and symbol map) the data and control information to obtain data symbols and control symbols, respectively. The processor 320 may also generate reference symbols, e.g., for the primary synchronization signal (PSS), secondary synchronization signal (SSS), and cell-specific reference signal (CRS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332*a* through 332*t*. Each modulator 332 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 332*a*-332*t* may be transmitted via the antennas 334*a*-334*t*, respectively.

At the UE 120*a*, the antennas 352*a* through 352*r* may receive the downlink signals from the BS 110*a* and may provide received signals to the demodulators (DEMODs) in transceivers 354*a* through 354*r*, respectively. Each demodulator 354 may condition (e.g., filter, amplify, downconvert, and digitize) a respective received signal to obtain input samples. Each demodulator may further process the input samples (e.g., for OFDM, etc.) to obtain received symbols. A MIMO detector 356 may obtain received symbols from all the demodulators 354*a*-354*r*, perform MIMO detection on the received symbols if applicable, and provide detected symbols. A receive processor 358 may process (e.g., demodulate, deinterleave, and decode) the detected symbols, provide decoded data for the UE 120*a* to a data sink 360, and provide decoded control information to a controller/processor 380.

On the uplink, at UE 120*a*, a transmit processor 364 may receive and process data (e.g., for the physical uplink shared channel (PUSCH)) from a data source 362 and control information (e.g., for the physical uplink control channel (PUCCH) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the demodulators in transceivers 354*a*-354*r* (e.g., for SC-FDM, etc.), and transmitted to the BS 110*a*. At the BS 110*a*, the uplink signals from the UE 120*a* may be received by the antennas 334, processed by the modulators 332, detected by a MIMO detector 336 if applicable, and further processed by a receive processor 338 to obtain decoded data and control information sent by the UE 120a. The receive processor 338 may provide the decoded data to a data sink 339 and the decoded control information to the controller/processor 340.

The controllers/processors 340 and 380 may direct the operation at the BS 110a and the UE 120a, respectively. The processor 340 and/or other processors and modules at the BS 110a may perform or direct the execution of processes for the techniques described herein. The memories 342 and 382 may store data and program codes for BS 110a and UE 120a, respectively. A scheduler 344 may schedule UEs for data transmission on the downlink and/or uplink.

Certain systems perform encoding for some physical channels. For example, some systems perform low density parity check (LDPC) encoding. In some examples, polar coding or other coding the may be used. LDPC involves encoding using a base graph (BG) that is defined by variable nodes (corresponding systematic information bits and parity bits) and check nodes. The encoding may involve lifting the base graph (making a number of copies of the base graph according to a lifting size Z) and interconnecting edges in the base graph using cyclic integer lifting values. The BG is associated with a code rate, which is sometimes referred to as the mother code rate. For example, in 5G NR, a first base graph (referred to as BG1, having N=3K) may have a ⅓ rate and a second base graph (referred to as BG2, having N=5K) may have a ⅕ rate. Rate matching may be performed to achieve code rates different than the mother code rates, for example, based on available transmission resources at the transmitting device. Puncturing may be performed to drop (e.g., not transmit or set as "0") one or more information bits. The rate matching includes bit selection and interleaving.

Figure 4:
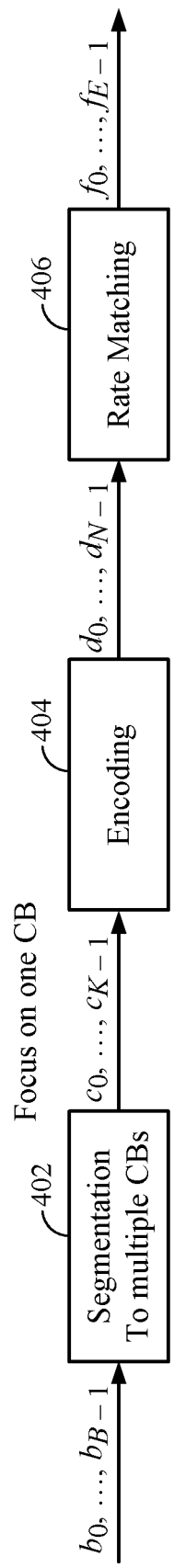
FIG. 4 is a block diagram illustrating an example encoding chain, in accordance with certain aspects of the present disclosure.

FIG. 4 is a block diagram illustrating an example encoding chain, in accordance with certain aspects of the present disclosure. As shown in FIG. 4, a transport block (TB) is segmented into one or more code blocks (CBs), for example, if the TB size (B) is larger than a threshold ($K_{cb}$). For example, bit sequence (denoted by $b_0, \ldots, b_{B-1}$) may be input to the code block segment 402. The threshold may be based on which BG is used. The bits output from code block segmentation (denoted by $c_0, \ldots, c_{K-1}$) are input to the encoding block 404 for encoding.

In some examples, the UL-SCH, DL-SCH, and PCH may be encoded with LDPC, and the BCH, DCI, and UCI may be encoded with polar code. After encoded, the encoded bits (denoted by $d_0, \ldots, d_{N-1}$) may include information bits and parity bits. After the encoding (e.g., and before constellation mapping), the coded bits ($d_0, \ldots, d_{N-1}$) are input to the rate matching block 406. Each CB may be encoded and rate matched separately to output the rate matched bit sequence (denoted by $f_0, \ldots, f_{E-1}$).

The rate matching may include bit selection and bit interleaving. For the bit selection, the coded bits ($d_0, \ldots, d_{N-1}$) are written to a circular buffer (e.g., of length $N_{cb}$). The rate matching output sequence length (denoted by E) is roughly equal to total number of coded bits available for transmission of the TB (denoted by G) divided by number of CBs (denoted by C), where E≈G/C is close to the number of resources available for transmission of a given CB. The code bits are read from the circular buffer to generate the output bit sequence (denoted by $e_0, \ldots, e_{E-1}$). The start place in the circular buffer to read the coded bits is a function of the redundancy version (RV) value (denoted by $rv_{id}$).

The bit interleaving includes interleaves the bit sequence from the circular buffer ($e_0, \ldots, e_{E-1}$) to the bit sequence ($f_0, \ldots, f_{E-1}$). The bit interleaving may involve putting systematic bits in the most significant bits (MSB) to have the highest protection (e.g., most reliability). The bit interleaving is a function of modulation order (denoted by $Q_m$). In some examples, the interleaving is a systematic bit priority mapping (SBPM) interleaving. The SBPM interleaver is a row-column interleaver that performs a row-wise write and a column-wise read. The number of rows is based on the modulation order.

As discussed above, aspects of the present disclosure relate to transmissions with multiple TCI-states. In some examples, a TCI-state is associated with a beam pair, antenna panel, a quasi-colocation (QCL) relation, and/or a TRP. Thus, multi-TCI state transmission may be associated with multiple beam pairs, multiple antenna panels, and/or multiple QCL relations which may be associated with one or more multiple TRPs.

In some examples, the TCI state may generally indicate to the UE an association between a downlink reference signal to a corresponding QCL type which may allow the UE to determine the receive beam to use for receiving a transmission. The QCL-type may be associated with a combination (e.g., set) of QCL parameters. In some examples, a QCL-TypeA indicates the ports are QCL'd with respect to Doppler shift, Doppler spread, average delay, and delay spread; QCL-TypeB indicates the ports are QCL'd with respect to Doppler shift, and Doppler spread; QCL-TypeC indicates the ports are QCL'd with respect to average delay and Doppler shift; and QCL-TypeD indicates the ports are QCL'd with respect to Spatial Rx parameter. Different groups of ports can share different sets of QCL parameters.

In some examples, for a multi-TCI state scenario, the same TB/CB (e.g., same information bits but can be different coded bits) is transmitted from multiple TCI states, such as two or more TRPs in multi-TRP scenario. The UE considers the transmissions from both TCI states and jointly decodes the transmissions. In some examples, the transmissions from the TCI states is at the same time (e.g., in the same slot, mini-slot, and/or in the same symbols), but across different RBs and/or different layers. The number of layers and/or the modulation order from each TCI state can be the same or different. In some examples, the transmissions from the TCI states can be at different times (e.g., in two consecutive mini-slots or slots). In some examples, the transmissions from the TRPs can be a combination of the above.

Figure 5:
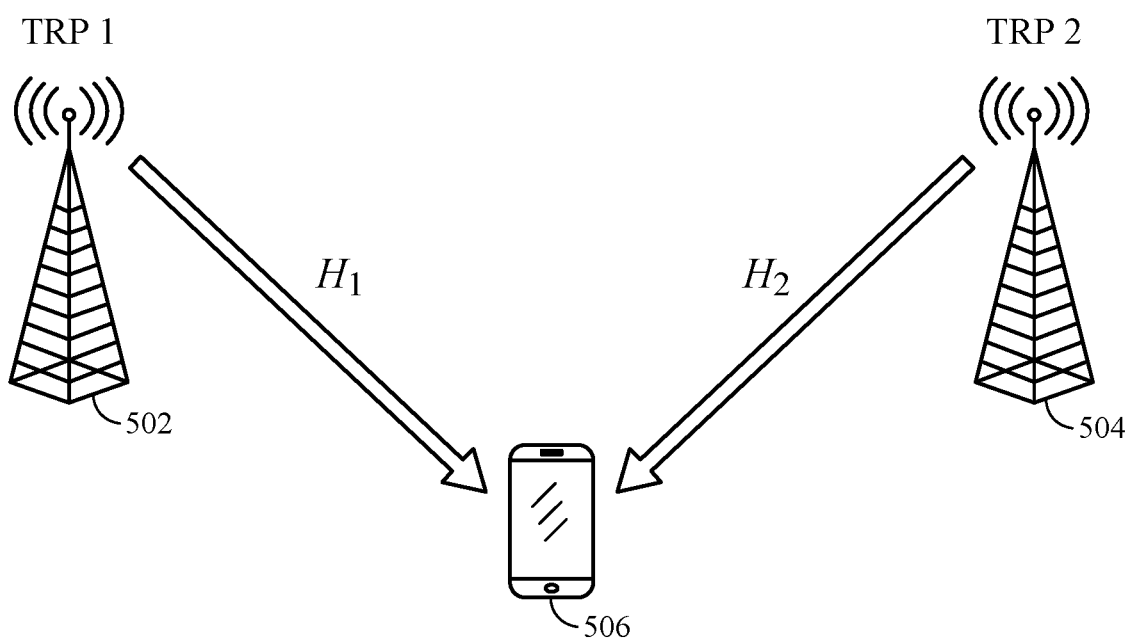
FIG. 5 is a diagram illustrating an example multiple transmission reception point (TRP) transmission scenario, in accordance with certain aspects of the present disclosure.

FIG. 5 is a diagram illustrating an example multi-TRP transmission scenario, in accordance with certain aspects of the present disclosure. As shown in FIG. 5, the UE 506 receives a same packet/TB/CB from both TRP 502 (TRP 1), which is associated with a first TCI state, and TRP 504 (TRP 2), which is associated with a second TCI state. The transmissions may be at the same time. In some examples, the TRPs transmit using disjoint resource sets. For example, TRP 502 transmits with resource set 1 and TRP 504 transmits with resource set 2.

Figure 6A:
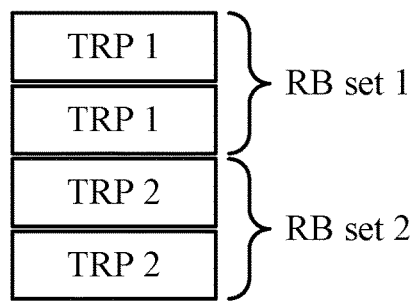
FIGS. 6A-D illustrate example disjoint resource sets for TRPs, in accordance with certain aspects of the present disclosure.
Figure 6B:
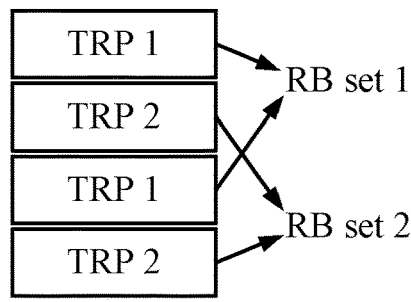
Figure 6C:
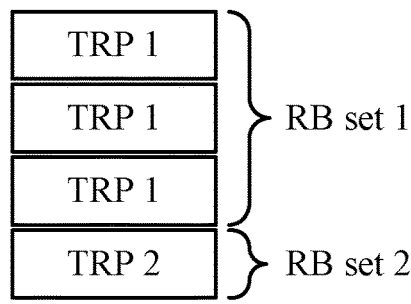
Figure 6D:
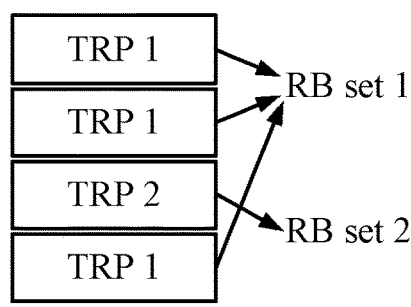

FIGS. 6A-6D illustrate example disjoint resource sets for different TRPs in a multi-TRP transmission, in accordance with certain aspects of the present disclosure. The disjoint resources for the TRPs may be localized or distributed. FIG. 6A and FIG. 6C illustrate localized resources and FIG. 6B and FIG. 6D illustrate distributed resources. The disjoint resources for the TRPs may have equal split or un-equal split. FIG. 6A and FIG. 6B illustrate equal split of resources and FIG. 6C and FIG. 6D illustrate unequal split of resources. Each unit may be one RB, a resource block group (RBG), or precoding RBG (PRG).

Although FIG. 5 and FIG. 6 illustrate a multi-TRP transmission scenario, in some examples, the TCI states can be associated with one TRP and the resource sets can be associated with different TCI states.

What is needed are techniques for rate matching for multi-TCI state transmissions.

Example Rate Matching for Downlink Transmission with Multiple Transmission Configurations Aspects of the present disclosure provide (de)rate matching techniques, such as joint or separate (de)rate matching, for downlink transmissions with multiple transmission configurations, such as multiple transmission configuration indicator (TCI) states. An example of a multi-TCI state transmission is a multi-TRP (multiple transmission reception point) transmission. Aspects provide for a downlink control information (DCI) transmission indicating rate matching parameters for the multi-TCI state transmission, the DCI may include parameters that are shared for multiple TCI states and/or that are separate for each TCI state. The DCI may be transmitted by one TRP or multiple TRPs.

According to certain aspects, TRPs in a multi-TRP transmission may communicate via backhaul to determine the rate matching parameters for the multi-TRP transmission.

As discussed above, a base station (BS) may perform bit segmentation and rate matching. For bit segmentation, the BS segments, the TB into one or more CBs. The BS encodes the CBs. The encoding may be LDPC encoding to produce a stream (sequence) of coded bits (e.g., a codeword). As discussed above, the rate matching includes bit selection and bit interleaving. For the bit selection, the BS writes (e.g., stores) the encoded bits in a circular buffer. When puncturing is performed, punctured bits (e.g., some systematic bits) are not stored in the circular buffer. For the rate matching, the BS reads the bits from the circular buffer and interleaves the bits read from the circular buffer. The BS can identify which coded bits in the circular buffer will be transmitted via which TCI state, the identification based on modulation orders corresponding to the multiple TRPs (if the modulation orders are different) and a resource element (RE) mapping rule for mapping modulation symbols to REs corresponding to the multiple TRPs. In some examples, the interleaving is SBPM interleaving. The interleaving may be based on modulation order.

According to certain aspects, the BS and UE can determine the RE mapping (e.g., based on an RE mapping rule). The identification of which coded bits are transmitted by which TRP is based on the RE mapping. In some examples, the TRP transmit using disjoint RB sets and different numbers of layers (rank) across the RB sets. The RE mapping may be in order of layer, frequency, symbol. The number of layers used for layer mapping may be based on which RB set (e.g., which TCI state) the mapping is done for. For example, the BS(s) may determine a mapping of the coded bits of the CB to RE by first mapping all layers to a first RE in a virtual resource block (VRB) in a symbol, then mapping to the next RE in the VRB, then mapping to the next VRB in the symbol, then mapping to a next symbol.

As discussed in more detail below, the (de)rate matching may be joint or separate for a multi-TCI state downlink transmission.

Figure 7:
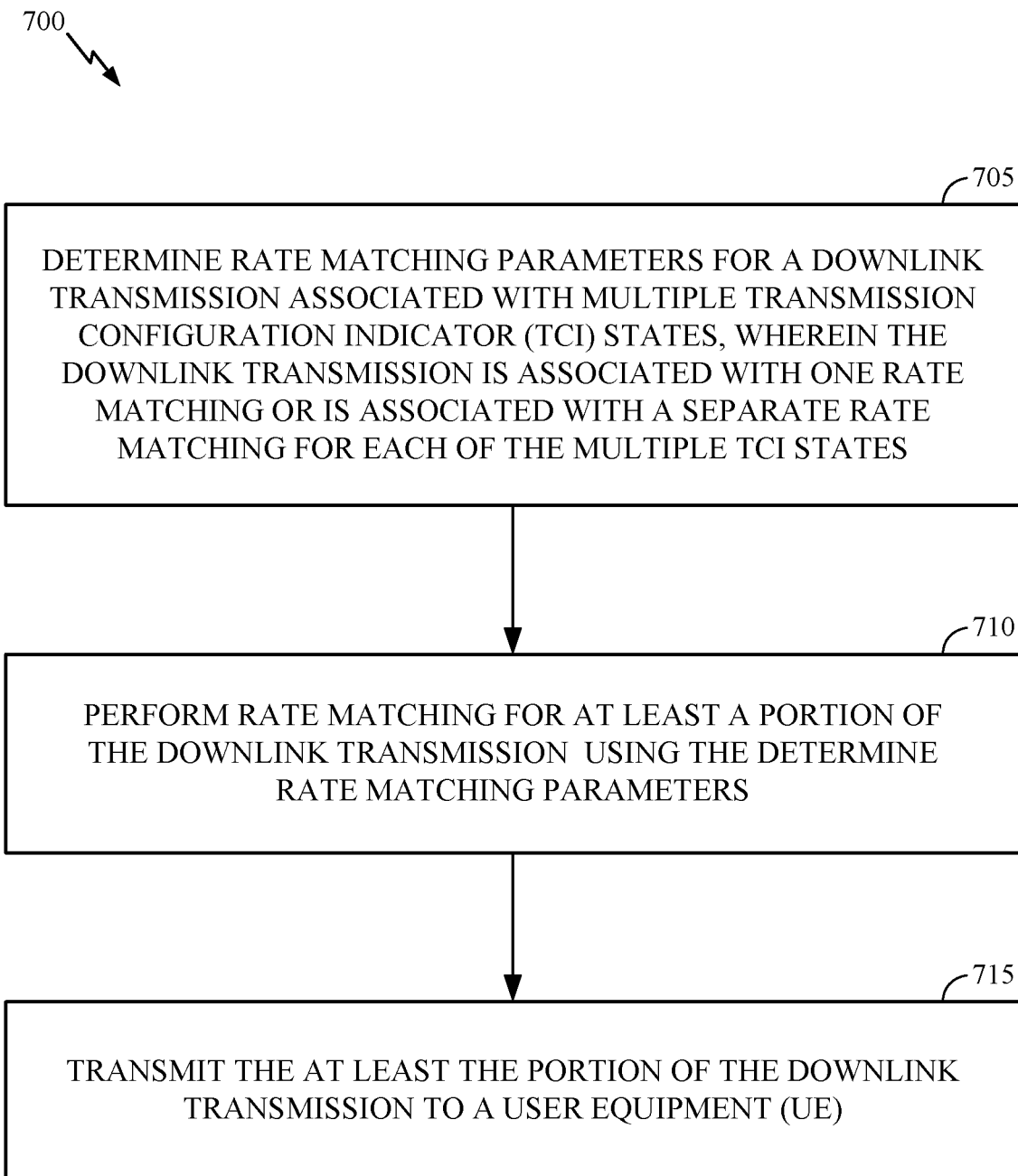
FIG. 7 is a flow diagram illustrating example operations that may be performed by a BS for rate matching for a multiple transmission indicator (TCI) state transmission, in accordance with certain aspects of the present disclosure.

FIG. 7 is a flow diagram illustrating example operations 700 for wireless communication, in accordance with certain aspects of the present disclosure. The operations 700 may be performed, for example, by a BS (e.g., such as the BS 110a in the wireless communication network 100). Operations 700 may be implemented as software components that are executed and run on one or more processors (e.g., ontroller/processor 340 of FIG. 3). Further, the transmission and reception of signals by the BS in operations 700 may be enabled, for example, by one or more antennas (e.g., antennas 334 of FIG. 3). In certain aspects, the transmission and/or reception of signals by the BS may be implemented via a bus interface of one or more processors (e.g., controller/processor 340) obtaining and/or outputting signals.

The operations 700 may begin, at 705, by determining rate matching parameters for a downlink transmission associated with multiple TCI states. The downlink transmission is associated with one rate matching or is associated with a separate rate matching for each of the multiple TCI states.

At 710, the BS performs rate matching for at least a portion of the downlink transmission using the determined rate matching parameters.

At 715, the BS transmits the at least the portion of the downlink transmission to a user equipment (UE).

In a first aspect, the downlink transmission is associated with one rate matching; and the DCI indicates at least one of: a single modulation order, a single redundancy version (RV), or a single set of antenna ports, common for the downlink transmission from the multiple TCI states.

In a second aspect, alone or in combination with the first aspect, performing the rate matching comprises: determining a number of coded bits of a code block (CB) of the downlink transmission to store in a circular buffer as the total number of transmission resources available at the multiple TCI states divided by a total number of CBs of the downlink transmission.

In a third aspect, alone or in combination with one or more of the first aspect and the second aspect, the BS reads the coded bits associated with the multiple TCI states from the circular buffer from a starting location based on the single RV.

In a fourth aspect, alone or in combination with one or more of the first through the third aspects, the BS performs bit interleaving of the coded bits read from the circular buffer, wherein the bit interleaving is based on a modulation order associated with the TCI state used for transmitting the coded bits or based on the minimum or maximum modulation order of the multiple TCI states.

In a fifth aspect, alone or in combination with one or more of the first through the fourth aspects, the BS scrambles the coded bits using a scrambling sequence associated with the BS for the at least the portion of the downlink transmission; and modulates the scrambled bits based on a modulation order of the BS.

In a sixth aspect, alone or in combination with one or more of the first through the fifth aspects, a same scrambling seed, modulation order, rank, or set of antenna ports is used by the multiple TCI states; the DCI indicates a single modulation order or a single set of antenna ports common for the multiple TCI states; the same scrambling seed comprises a user specific scrambling identifier (ID) or a physical cell identifier (PCI) of one of the multiple TCI states; and the BS signals the PCI to the UE via radio resource control (RRC) signaling or DCI.

In a seventh aspect, alone or in combination with one or more of the first through the sixth aspects, the DCI indicates at least one of: a separate set of resource blocks (RBs) associated with the downlink transmission for each of the multiple TCI states; a separate modulation order associated with the downlink transmission for each of the multiple TCI states; a separate set of antenna ports for each of the multiple TCI states; or a separate RV for each of the multiple TCI states; and the downlink transmission is associated with separate rate matchings.

In an eighth aspect, alone or in combination with one or more of the first through the seventh aspects, performing the rate matching comprises determining, separately for each of the multiple TCI states, a number of coded bits of a CB of the downlink transmission to store in a circular buffer as the number of transmission resources available for the TCI state divided by a total number of CBs of the downlink transmission.

In a ninth aspect, alone or in combination with one or more of the first through the eighth aspects, performing the rate matching comprises reading the coded bits sequentially from the circular buffer, separately for each TCI state, from a starting location based on one or more RVs for the TCI state, or reading the coded bits non-sequentially from the circular buffer by: reading coded bits corresponding to one or more systematic bits from a same starting location for the multiple TCI states; and reading coded bits corresponding to one or more parity bits from a different starting locations for the multiple TCI states.

In a tenth aspect, alone or in combination with one or more of the first through the ninth aspects, the BS maps all layers to each resource element (RE) in a virtual resource block (VRB) in a symbol, until the layers are mapped to all REs in the VRB; maps the layers to the REs in the next VRB in the symbol, until the layers are mapped to the REs in all VRBs in the symbol; maps the layers to the REs in the VRBs in the next symbol, until the layers are mapped to the REs in all VRBs in all symbols in a duration, wherein the number of layers used for the mapping is based on the number of layers associated with the TCI state associated with the frequency resources; and identifies which coded bits will be transmitted by which TCI state based on the RE mapping and the modulation orders corresponding to the TCI states.

In an eleventh aspect, alone or in combination with one or more of the first through the tenth aspects, transmitting the at least the portion of the downlink transmission comprises transmitting the same information bits of the CB using each of the multiple TCI states during a same duration and via different frequency resources, different number of layers, or both.

In a twelfth aspect, alone or in combination with one or more of the first through the eleventh aspects, determining the rate matching parameters for the downlink transmission comprises communicating with another BS via a backhaul.

In a thirteenth aspect, alone or in combination with one or more of the first through the twelfth aspects, the multiple TCI states are associated with different TRPs, different antenna panels of a TRP, different quasi co-colocation parameters, or a combination thereof.

Example Joint Rate Matching for Transmission with Multiple TCI States

According to certain aspects, one rate matching (e.g., joint rate matching) may be done to transmit coded bit across the TCI states involved in the multi-TCI state transmission (e.g., the multiple TCI states associated with one or multiple BSs, TRPs, and/or QCL relations). In this case, one or more TCI states may use joint rate matching using one or more common rate matching parameters, such as modulation order, RV, interleaving, etc.

According to certain aspects, when joint rate matching is performed, a single DCI can be provided to the UE, scheduling the multi-TCI state downlink transmission. The DCI may indicate the rate matching parameters for the multi-TCI state downlink transmission. For example, the DCI includes RBs (e.g., RB sets, RBG sets, or PRG sets), a modulation order, antenna ports (rank may be derived from the number of antenna ports), and/or a RV associated with the multi-TCI state downlink transmission. When joint rate-matching is used, one or more the parameters can be shared/common for all of the TCI states involved in the multi-TCI state downlink transmission. In some examples, the DCI includes a single modulation order, single set of antenna ports, and/or single RV that are common to the multiple TCI states (e.g., used by all of the TRPs for the rate matching).

According to certain aspects, when joint rate matching is performed, the BS(s) performs joint rate matching for a CB (of a TB comprising one or more CBs), using a same rate matching for one TCI state as for another TCI state involved in the multi-TCI state transmission (which may be on the same or a different TRP and the same or different BS) based on the rate matching parameters.

According to certain aspects, when joint rate matching is performed, the BS(s) determines a number of coded bits (G) to write in the circular buffer for transmission of the CB as the total number of transmission resources available at the multiple TCI states (e.g., the number of coded bits available for transmission of the TB) divided by a total number of the one or more CBs (C).

In some examples, when joint rate matching is performed, the BS(s) performs the same interleaving for one TCI state and for another TCI state, based on the same modulation order. For example, the BS(s) (for each TCI state and/or TRP) interleaves the bits using a minimum or maximum modulation order of the modulation orders associated with the multiple TCI states/TRPs. In some examples, when joint rate matching is performed, the BS(s) (for each TCI state/TRP) interleaves the bits using different modulation orders (e.g., the modulation order associated with the TCI state used for transmitting the coded bits).

Figure 8:
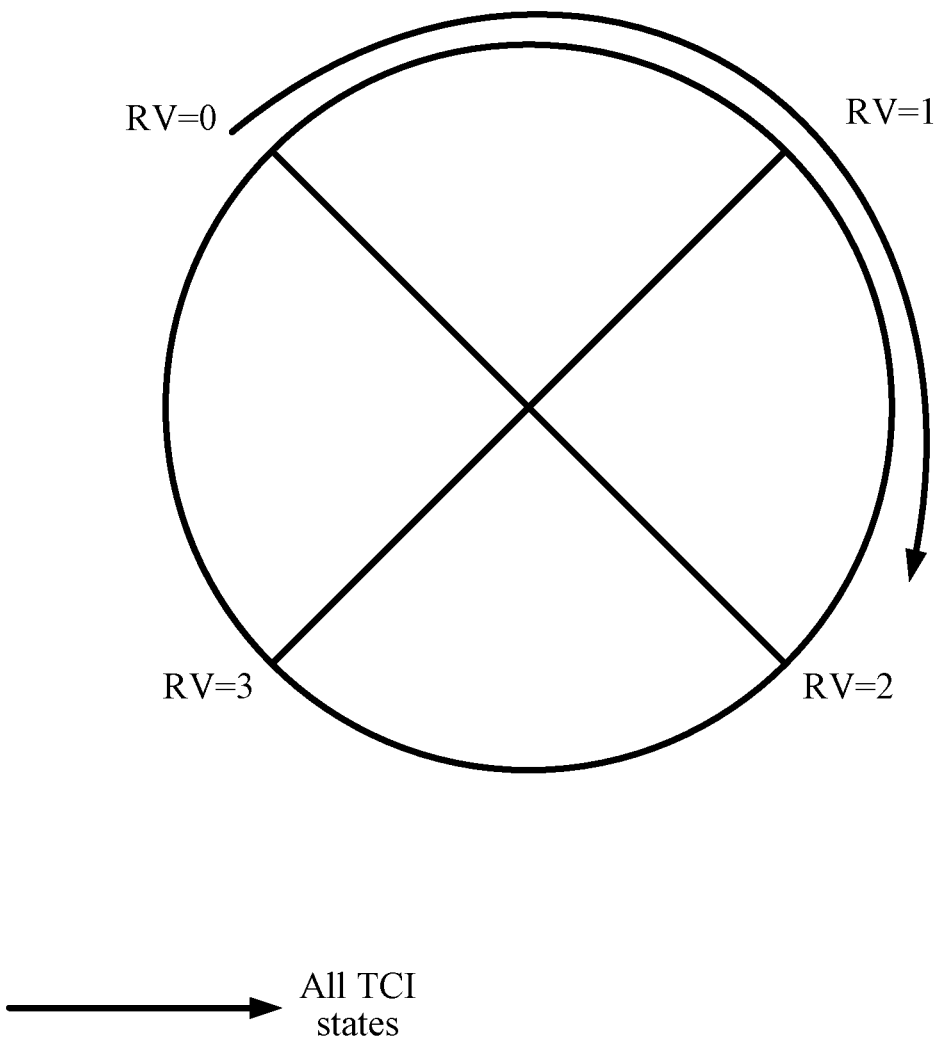
FIG. 8 illustrates an example read from a circular buffer based on redundancy version (RV), in accordance with certain aspects of the present disclosure.

According to certain aspects, when joint rate matching is performed, the BS(s) (for each TCI state/TRP) reads the coded bits sequentially from the circular buffer from a same starting location (e.g., based on a same RV), as shown in FIG. 8. In this case, the DCI may indicate a single RV.

According to certain aspects, when joint rate matching is performed, after the rate matching, and before transmission, the BS(s) (for each TCI state/TRP) scrambles the coded bits. In some examples, the TCI states are associated with have different scrambling sequences. In some examples, the BS(s) performs scrambling based on the TCI state that transmits the coded bits. In some examples, the BS(s) (for each TCI state/TRP) performs the same scrambling. After the scrambling, and before transmission, the BS(s) may perform modulation. In some examples, the BS(s) perform modulation using the same modulation order or using the modulation order of the respective TCI state that transmits the coded bits.

According to certain aspects, the rate matching, RE mapping, and DCI can be simplified when the multiple TCI states share transmission/rate matching parameters. For example, the TCI states may use the same scrambling initialization. The multiple TCI states may use the same scrambling identifier (n_ID), such as a UE-specific n_ID or the physical cell identifier (PCI) of one of the TRPs. The PCI may be signaled to the UE (to use for descrambling) via radio resource control (RRC) signaling or DCI. In some examples, the multiple TCI states may use the same modulation order and/or antenna ports. The DCI may include the single modulation order, RV, set of antenna ports, etc., shared by the multiple TCI states.

Example Separate Rate Matching for Transmission with Multiple TCI States

According to certain aspects, when separate rate matching is performed for each of the multiple TCI states, the BS(s) may transmit a DCI to the UE indicating separate rate matching parameters (e.g., separate RBs, separate modulation order, separate antenna ports, and/or separate RVs) for each of the multiple TCI states. In some examples, the separate rate matching parameters may be the same or different for the multiple TCI states. For example, the DCI may indicate separate values for each of the TCI states, such as a first set of RBs for the first TCI state and a second set of RBs for the second TCI state; a first modulation order for the first TCI state and a second modulation order for the second TCI state; a set of antenna ports for the first TCI state and a second set of antenna ports for the second TCI state; and/or a first RV for the first TCI state and a second RV for the second TCI state.

According to certain aspects, when separate rate matching is performed for each of the multiple TCI states, the BS(s) performs rate matching for a CB using different (e.g., separate/independent) rate matching parameters for a given TCI state/TRP as for the other TCI states/TRPs involved in the multi-TCI state transmission. In this case, the transmissions from one of the TCI states may be treated as a retransmission.

According to certain aspects, when separate rate matching is performed for each of the multiple TCI states, the rate-matching may include determining the number of coded bits (G) in the circular buffer for transmission of the CB as the number of transmission resources available only at the given TCI state/TRP divided by the total number of the one or more CBs (C). For example, $G_1$ may be the number of coded bits available for transmission of the TB from TRP 1 (with a first TCI state) and $G_2$ may be the number of coded bits available for transmission of the TB from TRP 2 (with a second TCI state).

Figure 9:
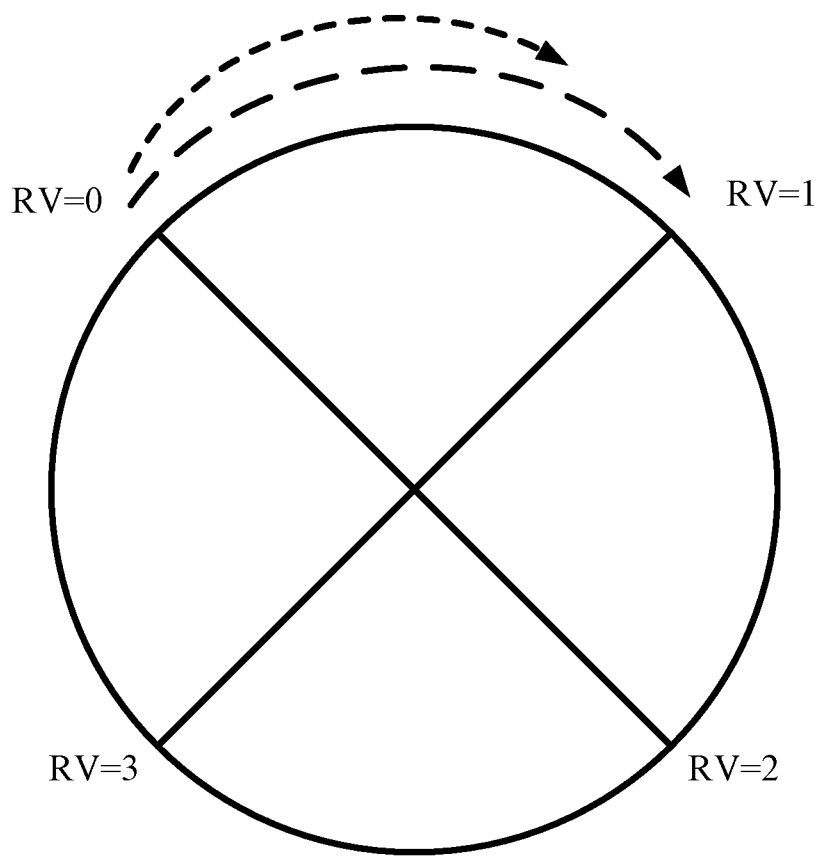
FIGS. 9-11 illustrates example reads from a circular buffer based on RVs, in accordance with certain aspects of the present disclosure.
Figure 10:
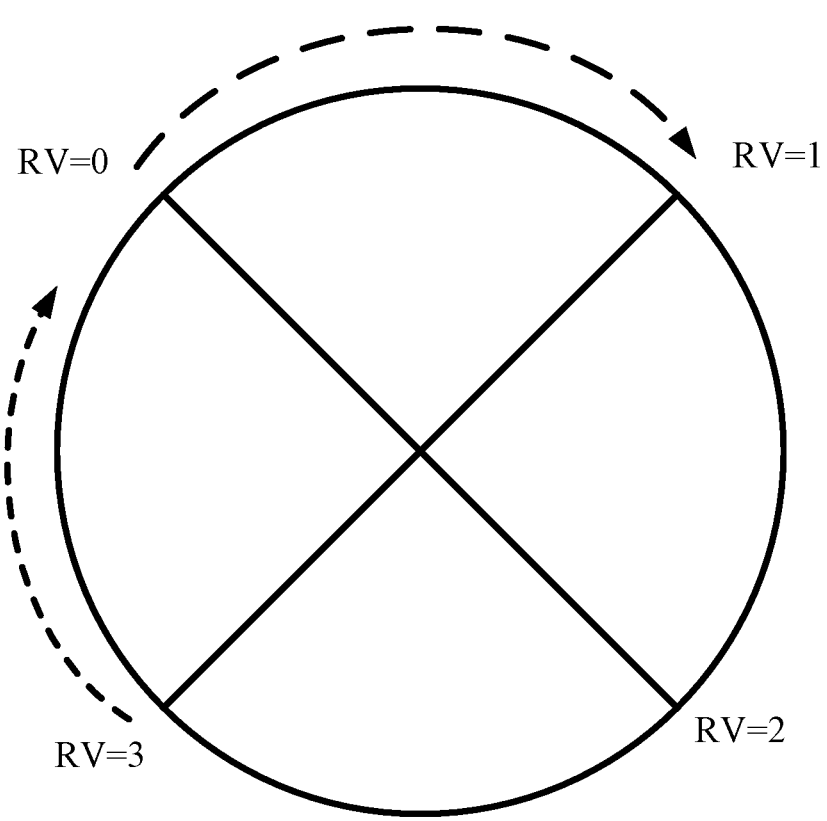
Figure 11:
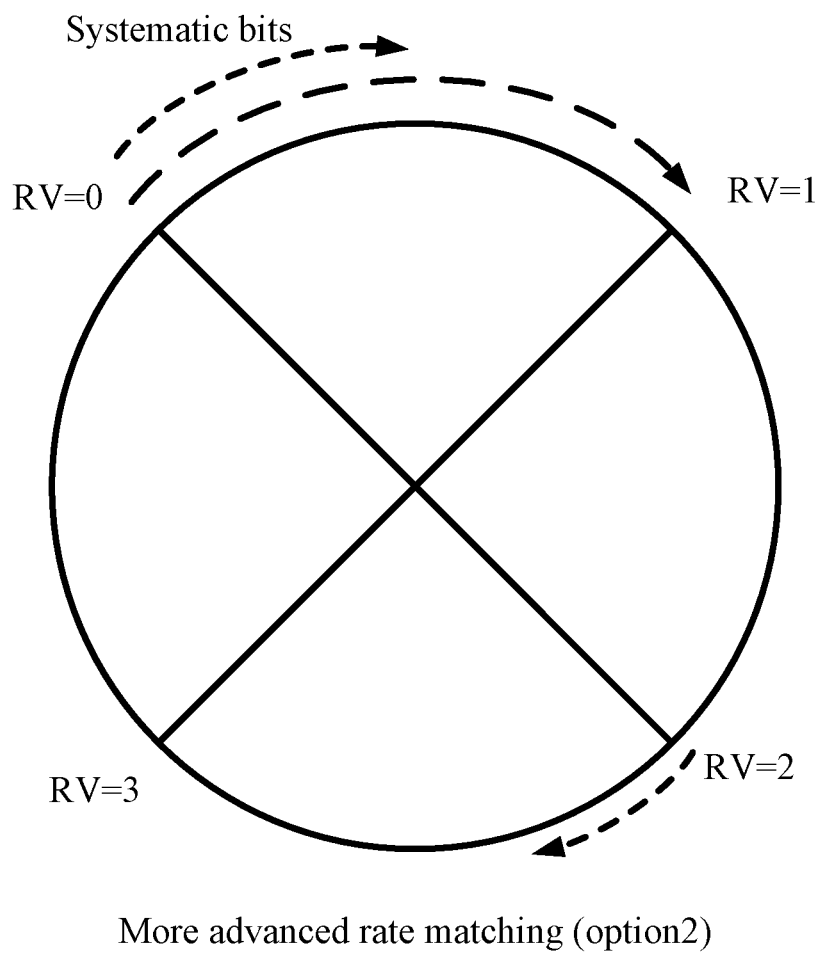

According to certain aspects, when separate rate matching is performed for each of the multiple TCI states, the separate rate matching may include reading the identified bits from the circular buffer from different starting locations. For example, BS(s) read from a location, for a given TCI state/TRP, based on the RV for that TCI state/TRP. Thus, as shown in FIGS. 9-11, coded bits for a first TCI state/TRP start in circular buffer at the first RV position and coded bits for the second TCI state/TRP start in circular buffer at the second RV position. As shown in FIG. 9, the TCI states/TRPs can have the same RV (although still separately indicated). As shown in FIG. 10, the TCI states/TRPs can have different, and separate, RVs.

As shown in FIG. 11, the BS(s) can read non-sequential bits from the circular buffer for a TCI state/TRP. For example, the non-sequential read can be based on multiple RVs (e.g., a third RV). In this case, the DCI can include multiples RVs for one TCI state/TRP. In some examples, for more protection of systematic bits, those bits may be transmitted from multiple TCI states/TRPs, while different parity bits may be sent from each TCI state/TRP. In the example shown in FIG. 11, one TCI state/TRP may read systematic bits starting from RV 0 and then may read parity bits, while another TCI state/TRP may also read the systematic bits starting from RV 0, but then reads other bits, such as parity bit, starting from the RV 2.

All of the steps after rate matching may also be done separately for each TCI state/TRP. For example, the B S(s) may scramble the CB bits for different TCI states/TRPs each using the respective scrambling sequence, modulate the scrambled bits based the respective modulation order, and perform layer mapping and mapping to VRB/PRBs based on the respective RBs and number of layers.

Although the separate rate matching, scrambling, modulation, RE mappings, the parameters is performed, the parameters can be signaled to the UE through one DCI.

Figure 12:
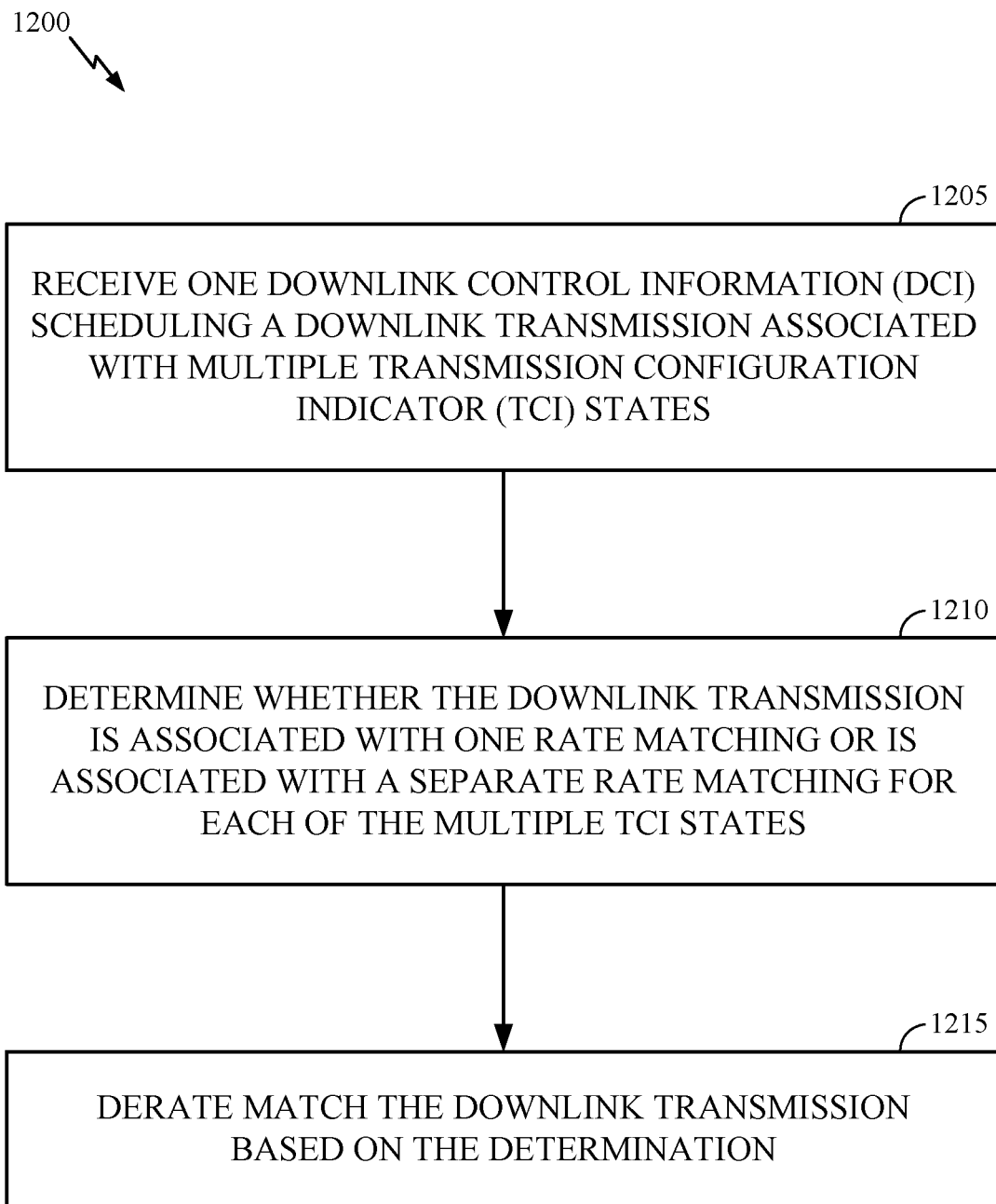
FIG. 12 is a flow diagram illustrating example operations that may be performed by a UE for de-rate matching for a multi-TCI state transmission, in accordance with certain aspects of the present disclosure.

FIG. 12 is a flow diagram illustrating example operations 1200 for wireless communications, in accordance with certain aspects of the present disclosure. The operations 1200 may be performed, for example, by a UE (e.g., such as a UE 120a in the wireless communication network 100) for de-rate matching for multi-TCI state downlink transmissions. The operations 1200 may be complimentary operations by the UE to the operations 700 performed by the BS. Operations 1200 may be implemented as software components that are executed and run on one or more processors (e.g., controller/processor 380 of FIG. 3). Further, the transmission and reception of signals by the UE in operations 1200 may be enabled, for example, by one or more antennas (e.g., antennas 352 of FIG. 3). In certain aspects, the transmission and/or reception of signals by the UE may be implemented via a bus interface of one or more processors (e.g., controller/processor 380) obtaining and/or outputting signals.

The operations 1200 may begin, at 1205, by receiving one DCI transmission scheduling a downlink transmission associated with multiple TCI states.

At 1210, the UE determines whether the downlink transmission is associated with one rate matching or is associated with a separate rate for each of the multiple TCI states.

At 1215, the UE derate matches the downlink transmission based on the determination.

In a first aspect, the DCI indicates at least one of: a single modulation order, a single RV, or a single set of antenna ports, common for the downlink transmission from the multiple TCI states; and the determination comprises determining the downlink transmission is associated with one rate matching.

In a second aspect, alone or in combination with the first aspect, the DCI indicates at least one of: a separate set of RBs associated with the downlink transmission for each of the multiple TCI states; a separate modulation order associated with the downlink transmission for each of the multiple TCI states; a separate set of antenna ports for each of the multiple TCI states; or a separate RV for each of the multiple TCI states; and the determination comprises determining the downlink transmission is associated with separate rate matchings.

In a third aspect, alone or in combination with one or more of the first aspect or the second aspect, the determination is based on the DCI, higher layer signaling, or a configuration of the UE.

In a fourth aspect, alone or in combination with one or more of the first through the third aspects, the UE identifies, based on a RE mapping, which coded bits in the downlink transmission are transmitted by which of the multiple TCI states.

In a fifth aspect, alone or in combination with one or more of the first through the fourth aspects, based on the identification, the UE demodulates the coded bits using the modulation order of the TCI state used to transmit the coded bits.

In a sixth aspect, alone or in combination with one or more of the first through the fifth aspects, the de-rate matching comprises deinterleaving the coded bits using a same modulation order regardless which TCI state transmitted the coded bits, the modulation order being the minimum or maximum modulation order of the multiple TCI states; or based on the identification, deinterleaving the code bits using the modulation order of the TCI state that transmitted the coded bits.

In a seventh aspect, alone or in combination with one or more of the first through the sixth aspects, based on the identification, the UE descrambles the coded bits using a scrambling sequence associated with the TCI state that transmitted the coded bits.

In an eighth aspect, alone or in combination with one or more of the first through the seventh aspects, receiving the downlink transmission comprising receiving the same information bits of one or more CBs, of a TB, from the multiple TCI states during a same duration and via different frequency resources, different number of layers, or both.

In a ninth aspect, alone or in combination with one or more of the first through the eighth aspects, determining the RE mapping comprises determining a mapping of the coded bits of the CB to RE by: mapping all layers to each RE in a VRB in a symbol, until the layers are mapped to all REs in the VRB; mapping the layers to the REs in the next VRB in the symbol, until the layers are mapped to the REs in all VRBs in the symbol; and mapping the layers to the REs in the VRBs in the next symbol, until the layers are mapped to the REs in all VRBs in all symbols in a duration, wherein the number of layers used for the mapping is based on the number of layers associated with the TCI state associated with the frequency resources.

In a tenth aspect, alone or in combination with one or more of the first through the ninth aspects, the UE descrambles the coded bits using a same scrambling seed regardless which TCI state transmitted the coded bits, wherein the scrambling seed comprises a user specific scrambling ID or a PCI of one of the multiple TRPs.

In an eleventh aspect, alone or in combination with one or more of the first through the tenth aspects, the determination comprises determining the downlink transmission is associated with separate rate matchings; and the DCI includes at least two RVs associated with the downlink transmission for at least one of the multiple TCI states.

In a twelfth aspect, alone or in combination with one or more of the first through the eleventh aspects, the determination comprises determining the downlink transmission is associated with separate rate matchings; and the UE demodulates the coded bits based on the modulation order of the TCI state that transmitted the coded bits; and descrambles the coded bits using a scrambling sequence associated with the TCI state that transmitted the coded bits.

In a thirteenth aspect, alone or in combination with one or more of the first through the twelfth aspects, the multiple TCI states are associated with different TRPs, different antenna panels of a TRP, different QCL parameters, or a combination thereof.

Figure 13:
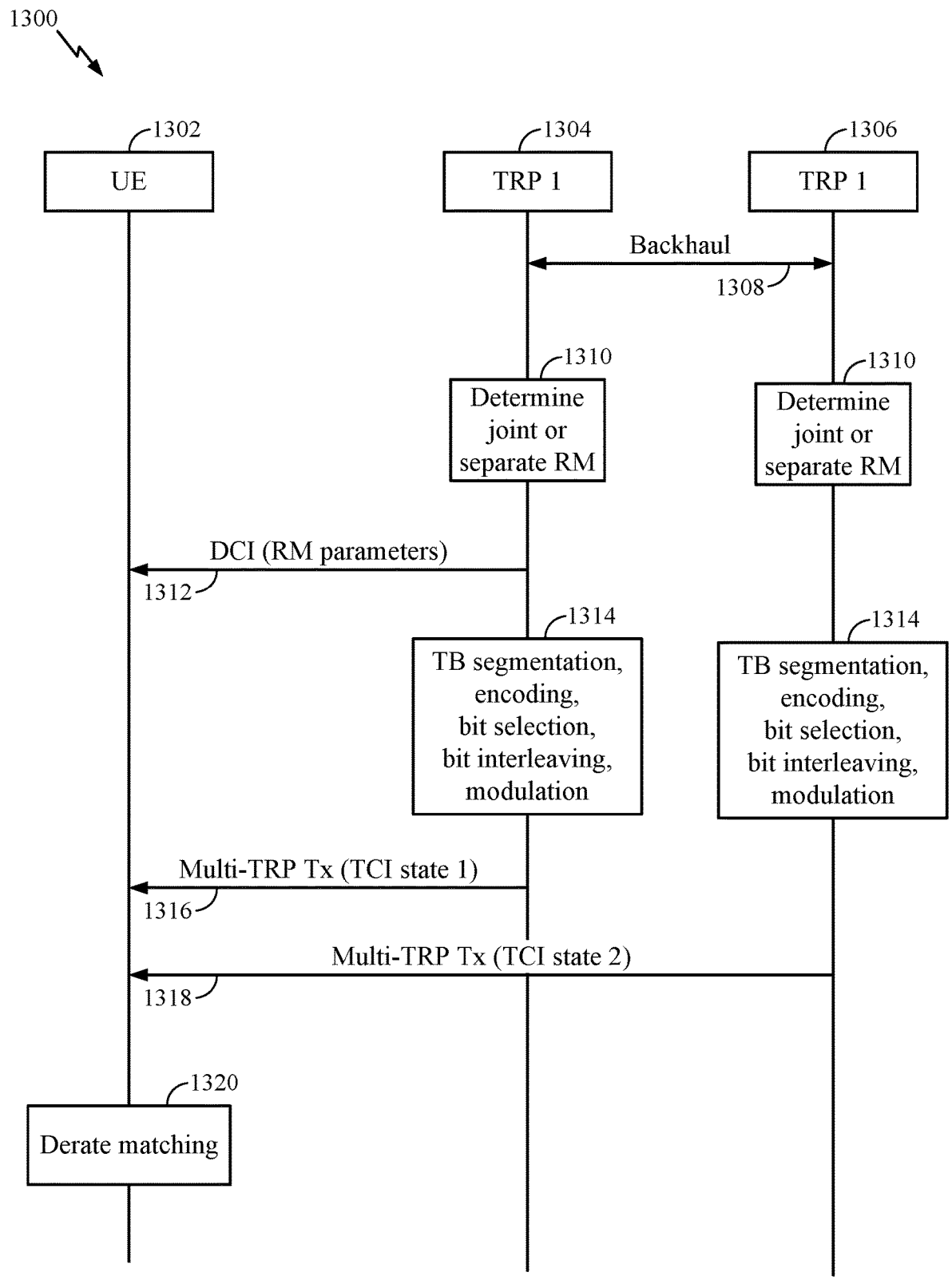
FIG. 13 is a call flow illustrating example rate-matching for a multi-TCI state transmission, in accordance with certain aspects of the present disclosure.

FIG. 13 is a call flow 1300 illustrating example (de)rate matching for a multi-TRP downlink transmission, in accordance with certain aspects of the present disclosure.

As shown in the call flow 1300, at 1308, TRP 1304 (TRP 1) and TRP 1306 (TRP 2) may communicate via a backhaul, for example, to negotiate or exchange information to determine whether to use joint or separate rate matching for a multi-TRP transmissions and/or determine the rate matching parameters to be used.

At 1310, the TRPs 1304 and 1306 determine the joint or separate rate matching and the rate matching parameters (e.g., based on the backhaul signaling).

At 1312, a DCI is sent to the UE 1302 providing the rate matching parameters for the multi-TRP downlink transmission. The DCI may include common rate matching parameters for the TRPs 1304 and 1306, or separate rate matching parameters for each of the TRPs 1304 and 1306. Although in the call flow 1300, the DCI is shown transmitted by the TRP 1304, the DCI could be sent by the TRP 1306 or by both of the TRPs 1304 and 1306.

At 1314, the TRPs 1304 and 1306 prepare the multi-TRP downlink transmission using the determined rate matching parameters, including TB segmentation, encoding, bit selection, bit interleaving, and modulation, in accordance with aspects of the present disclosure.

At 1316 the TRP 1304 transmits its bits of the of multi-TRP downlink transmission with a first TCI state (TCI state 1) and, at 1318, the TRP 1306 transmits its bits of the of multi-TRP downlink transmission with a second TCI state (TCI state 2). The transmissions at 1316 and 1318 could be at the same time or at different times. Although in the call 1300, two TRPs are shown for the multi-TRP transmission, different numbers of TRPs and/or TCI states could be involved for a multi-TRP or multi-TCI state downlink transmission.

At 1320, the UE 1302 derate matches the multi-TRP transmission, based on the joint or separate rate matching parameters indicated in the DCI, in accordance with aspects of the present disclosure.

Figure 14:
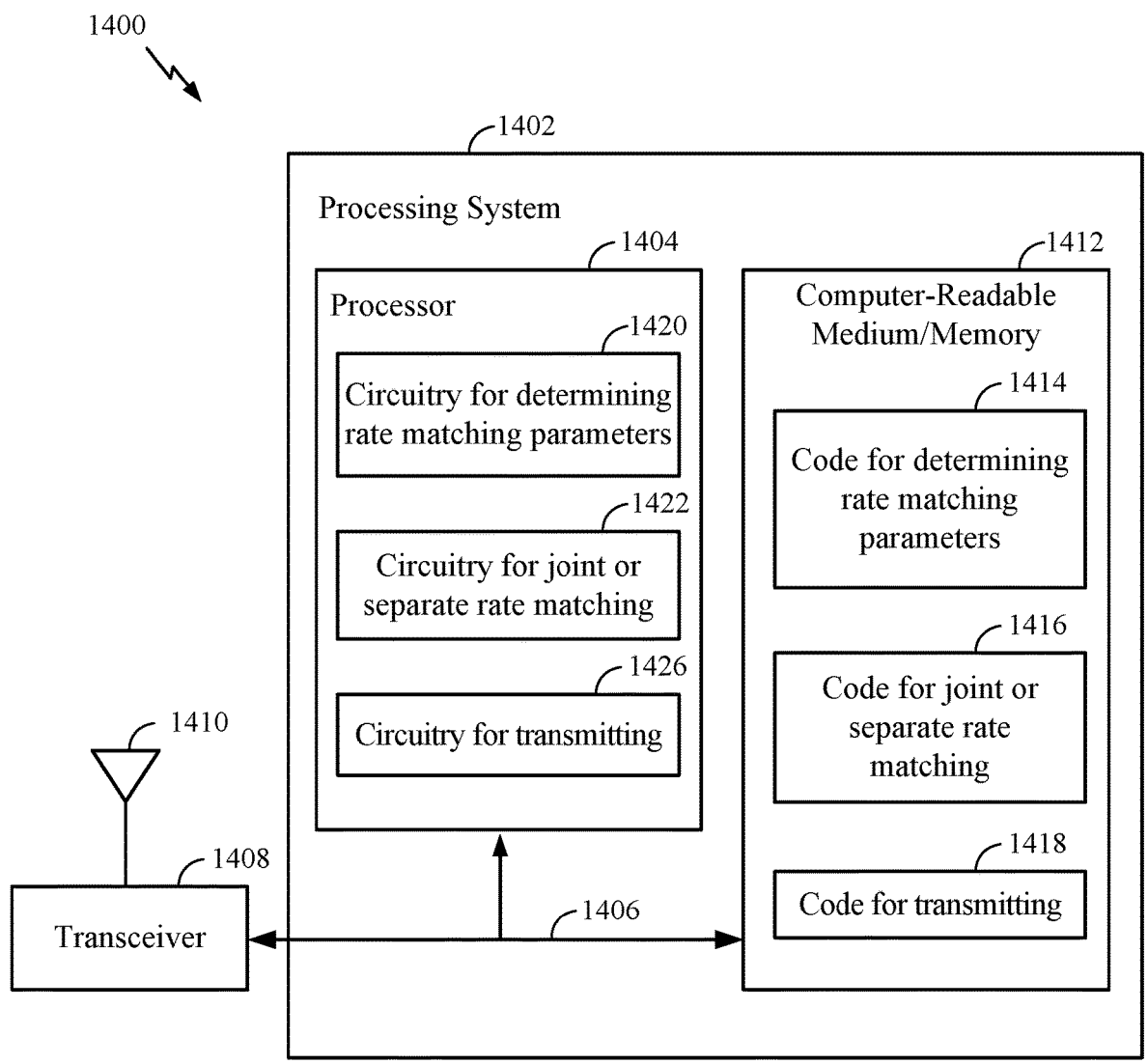
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 7. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/ memory 1412 is configured to store instructions (e.g., computer executable code) that when executed by the processor 1404, cause the processor 1404 to perform the operations illustrated in FIG. 7, or other operations for performing the various techniques discussed herein for rate matching for multi-TCI state transmission. In certain aspects, computer-readable medium/memory 1412 stores code 1414 for determining rate matching parameters for a multi-TCI state transmission; code 1416 for joint or separate rate matching; and code 1418 for transmitting, in accordance with certain aspects of the present disclosure. In certain aspects, the processor 1404 has circuitry configured to implement the code stored in the computer-readable medium/memory 1412. The processor 1404 includes circuitry 1420 for determining rate matching parameters for multi-TCI state transmission; circuitry 1422 for joint or separate rate matching;

and circuitry 1424 for transmitting, in accordance with certain aspects of the present disclosure.

Figure 15:
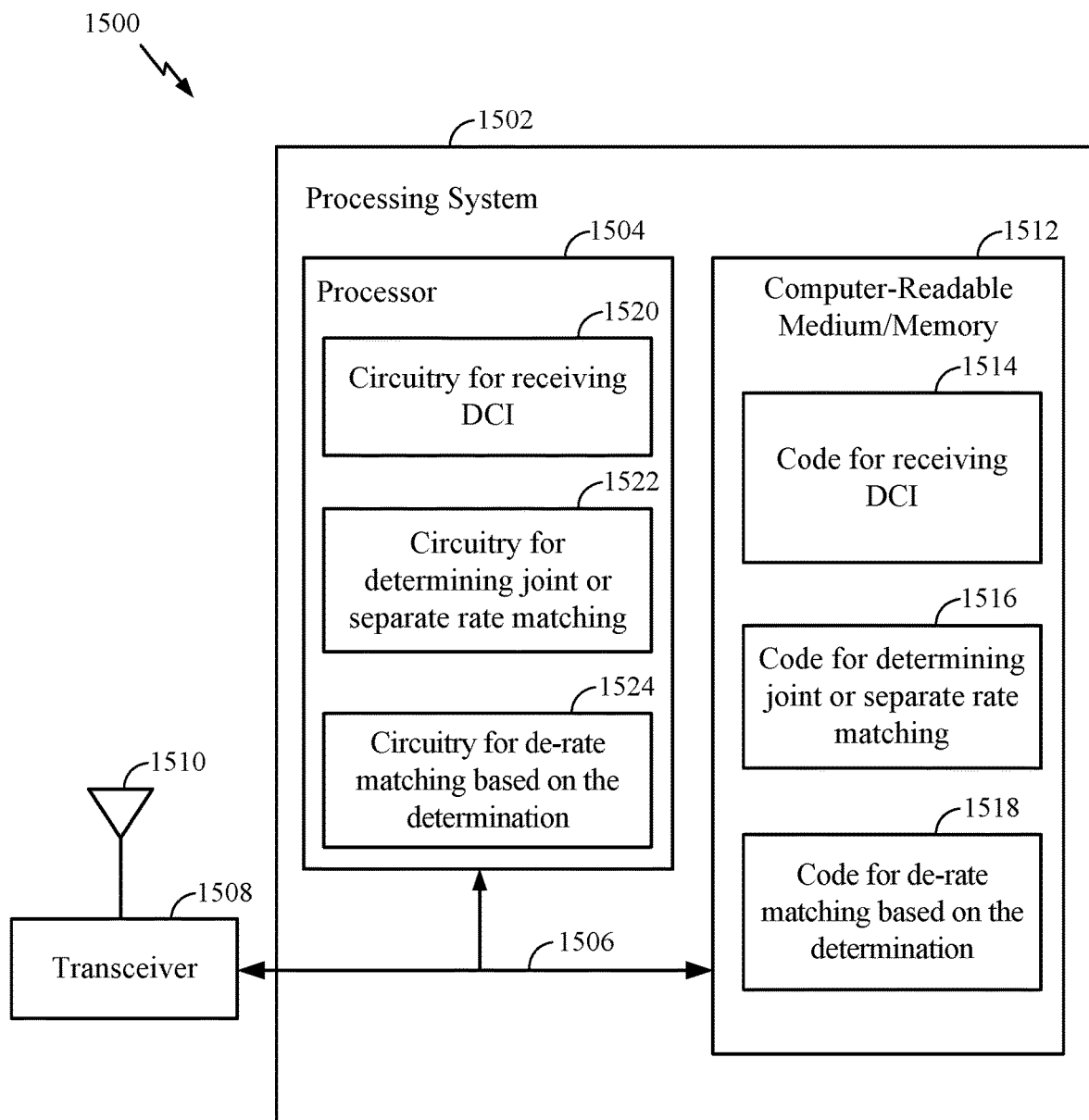
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 12. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer executable code) that when executed by the processor 1504, cause the processor 1504 to perform the operations illustrated in FIG. 12, or other operations for performing the various techniques discussed herein for rate matching for multi-TRP transmission. In certain aspects, computer-readable medium/memory 1512 stores code 1514 for receiving a single DCI with rate matching parameters for a multi-TCI state transmission; code 1516 for determining joint or separate matching for the multi-TCI state transmission; and code 1518 for de-rate matching the multi-TCI state transmission based on the determination, in accordance with aspects of the present disclosure. In certain aspects, the processor 1504 has circuitry configured to implement the code stored in the computer-readable medium/memory 1512. The processor 1504 includes circuitry 1520 for receiving DCI with rate matching parameters for a multi-TCI state transmission; circuitry 1522 for determining joint or separate rate matching for the multi-TCI state transmission; and circuitry 1524 for de-rate matching the multi-TCI state transmission based on the determination, in accordance with aspects of the present disclosure.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). New Radio (NR) is an emerging wireless communications technology under development in conjunction with the 5G Technology Forum (SGTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project2" (3GPP2).

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7, and/or FIG. 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving one downlink control information (DCI) scheduling a downlink transmission associated with multiple transmission configuration indicator (TCI) states, the DCI indicating a different redundancy version (RV) for each of the multiple TCI states;
   determining the downlink transmission is associated with a separate rate matching for each of the multiple TCI states; and
   derate matching the downlink transmission based on the determinations wherein the downlink transmission includes systematic bits and parity bits, and
   wherein the systematic bits use the same RV for each of the multiple TCI states and the parity bits use the different RV for each of the multiple states.

2. The method of claim 1, further comprising:
   identifying, based on a resource element (RE) mapping, which coded bits in the downlink transmission are transmitted by which of the multiple TCI states.

3. The method of claim 2, further comprising:
   based on the identification, demodulating the coded bits using a modulation order of the TCI state used to transmit the coded bits.

4. The method of claim 2, wherein the derate matching comprises:
   deinterleaving the coded bits using a same modulation order regardless which TCI state transmitted the coded bits, the modulation order being the minimum or maximum modulation order of the multiple TCI states; or
   based on the identification, deinterleaving the code bits using the modulation order of the TCI state that transmitted the coded bits.

5. The method of claim 2, further comprising:
   based on the identification, descrambling the coded bits using a scrambling sequence associated with the TCI state that transmitted the coded bits.

6. The method of claim 2, wherein receiving the downlink transmission comprising receiving the same information bits of one or more code blocks (CBs), of a transport block (TB), from the multiple TCI states during a same duration and via different frequency resources, different number of layers, or both.

7. The method of claim 2, wherein determining the RE mapping comprises determining a mapping of the coded bits of a code block (CB) to REs by:
   mapping all layers to each RE in a virtual resource block (VRB) in a symbol, until the layers are mapped to all REs in the VRB;
   mapping the layers to the REs in the next VRB in the symbol, until the layers are mapped to the REs in all VRBs in the symbol; and
   mapping the layers to the REs in the VRBs in the next symbol, until the layers are mapped to the REs in all VRBs in all symbols in a duration,
   wherein the number of layers used for the mapping is based on the number of layers associated with the TCI state associated with the frequency resources.

8. The method of claim 2, further comprising:
   descrambling the coded bits using a same scrambling seed regardless which TCI state transmitted the coded bits, wherein the scrambling seed comprises a user specific scrambling identifier (ID) or a physical cell identifier (PCI) of a transmission reception point (TRP) associated with one of the multiple TCI states.

9. The method of claim 1, wherein:
   the determination comprises determining the downlink transmission is associated with separate rate matchings; and
   the method further comprises:
      demodulating coded bits based on a modulation order of the TCI state that transmitted the coded bits; and
      descrambling the coded bits using a scrambling sequence associated with the TCI state that transmitted the coded bits.

10. The method of claim 1, wherein the multiple TCI states are associated with different transmission reception points (TRPs), different antenna panels of a TRP, different quasi co-colocation parameters, or a combination thereof.

11. A method for wireless communications by a base station (BS), comprising:
    determining rate matching parameters for a downlink transmission associated with multiple transmission configuration indicator (TCI) states, wherein the downlink transmission is associated with one rate matching or is associated with a separate rate matching for each of the multiple TCI states;
    performing rate matching for at least a portion of the downlink transmission using the determined rate matching parameters;
    transmitting a downlink control information (DCI) to a user equipment, the DCI indicating a different redundancy version (RV) for each of the multiple TCI states; and
    transmitting the at least the portion of the downlink transmission to a user equipment (UE),
    wherein performing the rate matching comprises:
       determining, separately for each of the multiple TCI states, a number of coded bits of a code block (CB) of the downlink transmission to store in a circular buffer as the number of transmission resources available for the TCI state divided by a total number of CBs of the downlink transmission,
reading the coded bits non-sequentially from the circular buffer by:
reading coded bits corresponding to one or more systematic bits from a same starting location for the multiple TCI states; and
reading coded bits corresponding to one or more parity bits from a different starting location for the multiple TCI states.

12. The method of claim 11, wherein performing the rate matching comprises:
determining a number of coded bits of a code block (CB) of the downlink transmission to store in a circular buffer as the total number of transmission resources available at the multiple TCI states divided by a total number of CBs of the downlink transmission.

13. The method of claim 12, further comprising:
reading the coded bits associated with the multiple TCI states from the circular buffer from a starting location based on the RV corresponding to each TCI state.

14. The method of claim 13, further comprising performing bit interleaving of the coded bits read from the circular buffer, wherein the bit interleaving is based on the minimum or maximum modulation order of the multiple TCI states.

15. The method of claim 14, further comprising:
scrambling the coded bits using a scrambling sequence associated with the BS for the at least the portion of the downlink transmission; and
modulating the scrambled bits based on a modulation order of the BS.

16. The method of claim 11, wherein:
a same scrambling seed, modulation order, rank, or set of antenna ports is used by the multiple TCI states;
the same scrambling seed comprises a user specific scrambling identifier (ID) or a physical cell identifier (PCI) of one of the multiple TCI states; and
the method further comprises signaling the PCI to the UE via radio resource control (RRC) signaling or DCI.

17. The method of claim 11, further comprising:
mapping all layers to each resource element (RE) in a virtual resource block (VRB) in a symbol, until the layers are mapped to all REs in the VRB;
mapping the layers to the REs in the next VRB in the symbol, until the layers are mapped to the REs in all VRBs in the symbol;
mapping the layers to the REs in the VRBs in the next symbol, until the layers are mapped to the REs in all VRBs in all symbols in a duration,
wherein the number of layers used for the mapping is based on the number of layers associated with the TCI state associated with the frequency resources; and
identifying which coded bits will be transmitted by which TCI state based on the RE mapping and the modulation orders corresponding to the TCI states.

18. The method of claim 11, wherein transmitting the at least the portion of the downlink transmission comprises transmitting the same information bits of a code block (CB) using each of the multiple TCI states during a same duration and via different frequency resources, different number of layers, or both.

19. The method of claim 11, wherein determining the rate matching parameters for the downlink transmission comprises communicating with another BS via a backhaul.

20. The method of claim 11, wherein the multiple TCI states are associated with different transmission reception points (TRPs), different antenna panels of a TRP, different quasi co-colocation parameters, or a combination thereof.

21. An apparatus for wireless communications, comprising:
means for receiving one downlink control information (DCI) scheduling a downlink transmission associated with multiple transmission configuration indicator (TCI) states, the DCI indicating different redundancy versions for each TCI state;
means for determining the downlink transmission is associated with a separate rate matching for each of the multiple TCI states; and
means for derate matching the downlink transmission based on the determination,
wherein the downlink transmission includes systematic bits using the same RV for each TCI state and parity bits that use the different RVs for each TCI state.

22. An apparatus for wireless communications, comprising:
means for determining rate matching parameters for a downlink transmission associated with multiple transmission configuration indicator (TCI) states, wherein the downlink transmission is associated with one rate matching or is associated with a separate rate matching for each of the multiple TCI states;
means for performing rate matching for at least a portion of the downlink transmission using the determined rate matching parameters;
means for transmitting a downlink control information (DCI) to a user equipment, the DCI indicating a different redundancy version (RV) for each of the multiple TCI states; and
transmitting the at least the portion of the downlink transmission to a user equipment (UE),
wherein systematic bits in the downlink transmission are transmitted using the same RV for all of the multiple TCI states and parity bits in the downlink transmission are transmitted using the different RVs for each of the multiple TCI states.

* * * * *